April 26, 1960  C. E. HOLADAY ET AL  2,934,700
APPARATUS FOR DETERMINING THE OIL CONTENT OF SUBSTANCES
Filed May 27, 1955  5 Sheets-Sheet 1

INVENTORS
CHARLES E. HOLADAY
HARRY F. COOKE
WILBUR K. MARBLE
JOHN E. LARRISON

BY R. Hoffman  ATTORNEY

INVENTORS
CHARLES E. HOLADAY
HARRY F. COOKE
WILBUR K. MARBLE
JOHN E. LARRISON
BY
R. Hoffman ATTORNEY April 26, 1960 C. E. HOLADAY ET AL 2,934,700
APPARATUS FOR DETERMINING THE OIL CONTENT OF SUBSTANCES
Filed May 27, 1955 5 Sheets-Sheet 3
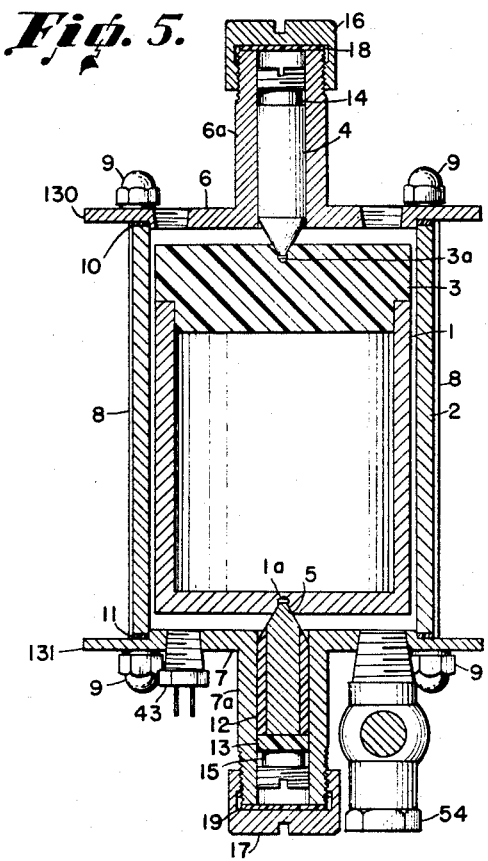
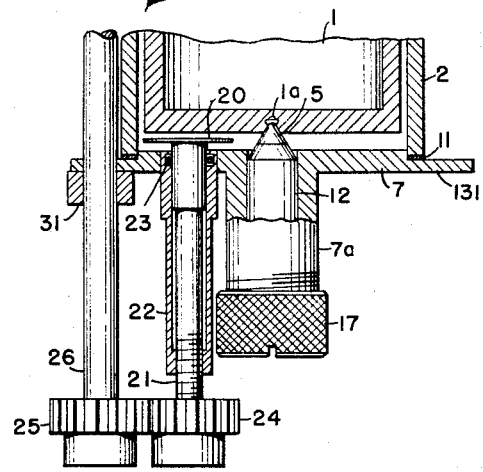
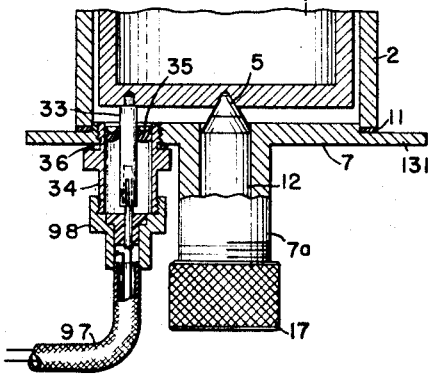
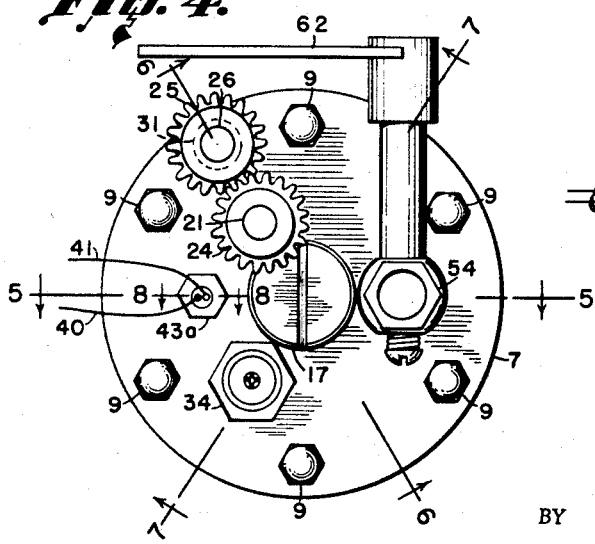
INVENTORS
CHARLES E. HOLADAY
HARRY F. COOKE
WILBUR K. MARBLE
JOHN E. LARRISON
BY
R. Hoffman ATTORNEY April 26, 1960    C. E. HOLADAY ET AL    2,934,700
APPARATUS FOR DETERMINING THE OIL CONTENT OF SUBSTANCES
Filed May 27, 1955    5 Sheets-Sheet 4

INVENTORS
CHARLES E. HOLADAY
HARRY F. COOKE
WILBUR K. MARBLE
JOHN E. LARRISON
BY
R. Hoffman    ATTORNEY April 26, 1960 C. E. HOLADAY ET AL 2,934,700
APPARATUS FOR DETERMINING THE OIL CONTENT OF SUBSTANCES
Filed May 27, 1955 5 Sheets-Sheet 5

*Fig. 11.*

INVENTORS
CHARLES E. HOLADAY
HARRY F. COOKE
WILBUR K. MARBLE
JOHN E. LARRISON

BY R. Hoffman ATTORNEY

United States Patent Office 2,934,700
Patented Apr. 26, 1960

2,934,700

APPARATUS FOR DETERMINING THE OIL CONTENT OF SUBSTANCES

Charles E. Holaday, Arlington, Va., Harry F. Cooke, Little Rock, Ark., Wilbur K. Marble, Stoneville, Miss., and John E. Larrison, Syracuse, N.Y.; dedicated to the Public Application May 27, 1955, Serial No. 511,812

2 Claims. (Cl. 324—61)

(Granted under Title 35, U.S. Code (1952), sec. 266)

A non-exclusive, irrevocable, royalty-free license in the invention herein described, for all purposes of the United States Government, throughout the world, with the power to grant sublicenses for such purposes, is hereby granted to the Government of the United States of America.

The patent rights for the United States in any invention in the patent to be granted on this application are dedicated to the Public.

This invention relates to improvements in apparatus for determining the relative proportions of two known liquids in a mixture. More particularly, it relates to apparatus for determining the amount of oil in cottonseed and other oil-bearing seeds.

If two liquids having different dielectric values are intimately mixed, as by forming a solution of one in the other, the resultant mixture will have a dielectric value dependent on the relative proportions of the two components. When the dielectric values of the pure substances and of a plurality of mixtures of known proportions are charted, the proportions in an unknown mixture may be calculated from the observed dielectric value of the mixture.

One object of this invention is to provide an improved apparatus for measuring the dielectric properties of liquids.

A further object of this invention is to provide an apparatus for determining the percentage of oil in cottonseed by measuring the variations in dielectric properties of a number of different solutions of oil in a solvent, such as orthodichlorobenzene.

Another object is to provide a device for determining the amount of oil in cottonseed which requires only a few minutes operation for the completion of the test.

Still another object is to provide a novel capacitance cell for holding the oil solution to be tested.

An additional object is to provide such a cell with means for adjusting its capacitance.

A further object is to provide an electrical measuring circuit for use in conjunction with the capacitance cell.

Further objects will become apparent from the detailed description of the invention set forth below and from the accompanying drawings in which:

Figure 4 is a bottom view of the same cell;

Figure 5 is a vertical sectional view of the capacitance cell taken on line 5—5 of Figures 3 and 4, showing the method of mounting the internal structure;

Figure 6 is a fragmentary vertical sectional view taken on line 6—6 of Figure 4 showing the means for adjusting the capacitance of the cell;

Figure 7 is a fragmentary vertical sectional view taken on line 7—7 of Figure 4 showing the means for making electrical contact with the elements of the capacitance cell;

Figure 11 is a detailed diagram of the capacitance meter circuit.

Figure 1:
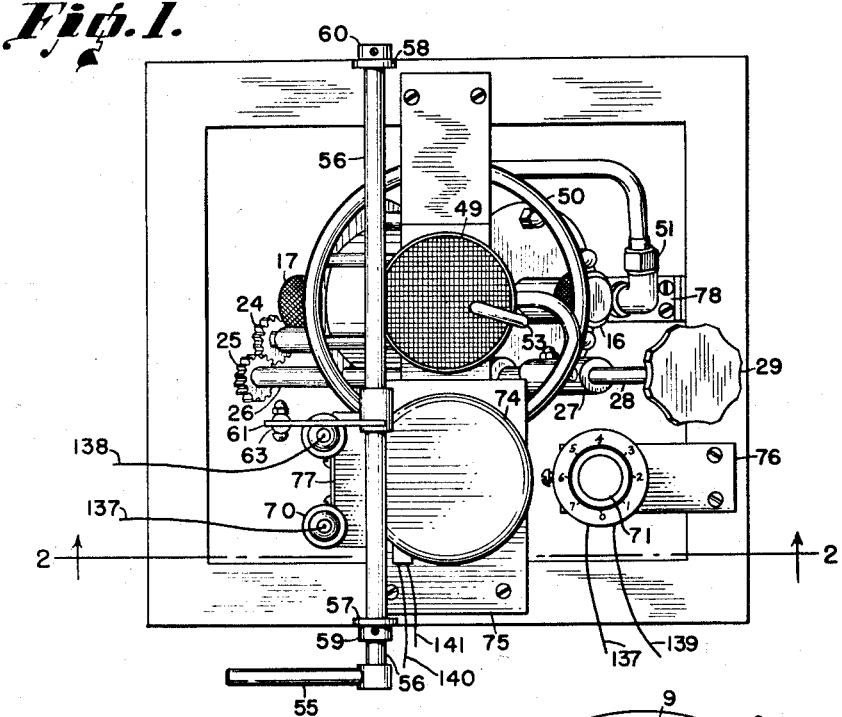
Figure 1 is a top view of the complete assembly including the capacitance cell mounted in a tank which contains a constant temperature bath.
Figure 3:
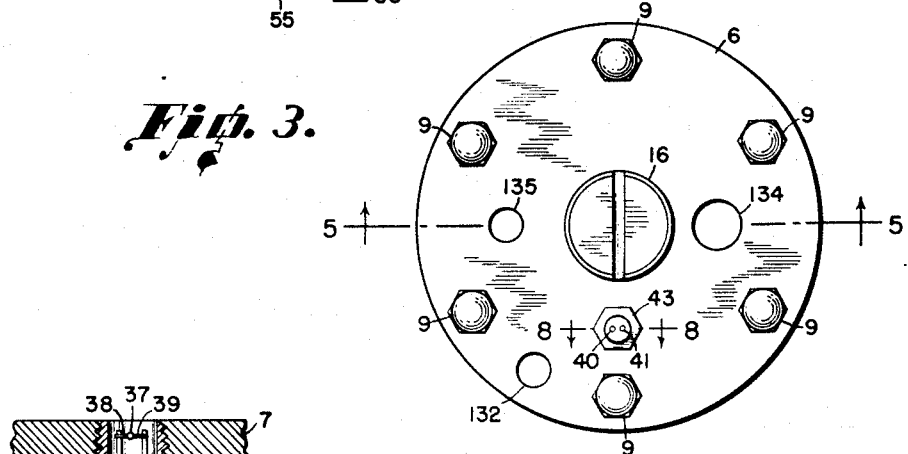
Figure 3 is a top view of the capacitance cell showing the structure of the top plate of the cell.

The apparatus consists of the capacitance cell, hereinafter referred to merely as the "cell," mounted in a tank which holds a constant temperature bath whose temperature is electrically controlled and regulated, and an electronic capacitance meter associated with the cell for measuring the dielectric coefficient of a liquid placed in the cell.

The capacitance cell comprises condenser plates in the form of concentric metal inner and outer cylinders 1 and 2, respectively (Figure 5). In the preferred form of the invention, the outer cylinder is 4⅝ inches long and has an inside diameter of 3 inches. The inner cylinder is 3½ inches long and has an outside diameter of 2⅞ inches. Inner cylinder 1 has an integral metal bottom and is cup-like in form. The upper end of this cylinder is closed by a plastic plug 3 which acts as a seal to prevent the entry of liquid into the cylinder, and at the same time acts as an electrical insulator. A conical shaped depression 1a is formed in the center of the bottom of the cylinder 1. A like depression 3a is formed in the center of the top of the insulating plug 3. The inner cylinder 1 is supported and positioned by two rods 4 and 5 having cone shaped ends which are inserted into the cone shaped depressions 3a and 1a, respectively. Outer cylinder 2 is provided with an upper metallic cylinder head 6 and a lower metallic cylinder head 7, thereby forming in effect a closed cylinder. Cylinder heads 6 and 7 are clamped to outer cylinder 2 by a plurality of tie bolts 8 and nuts 9. The junctions between the outer cylinder 2 and the cylinder heads 6 and 7 are sealed by gaskets 10 and 11 made of resilient plastic. As can be seen from Figure 5, the central portion of cylinder heads 6 and 7 are made somewhat thicker than flanges 130 and 131, respectively, and extend down into outer cylinder 2. In this manner electrical contact is maintained between cylinder 2 and heads 6 and 7. Upper cylinder head 6 and lower cylinder head 7 have hollow bosses 6a and 7a, in which support rods 4 and 5, respectively, are inserted. Lower support rod 5 is surrounded by a palstic tube 12 which acts as an electrical insulator and the end of this rod is insulated by a plastic plug 13. Adjusting screws 14 and 15 are threaded into the cylinder head bosses 6a and 7a, respectively. By screwing the two adjusting screws 14 and 15 in or out the support rods 4 and 5 are pushed in and out thereby axially positioning the inner cylinder 1 within the closed cylinder 2. The space between the bottom of the inner cylinder 1 and the lower cylinder head 7 of the cylinder 2 forms a part of the electrically active space of the cell. The space between insulating plug 3 and upper cylinder head 6 for all practical purposes does not form a part of the electrically active space of the cell. This being the case, the capacitance of the cell can be changed by increasing or decreasing the space between the bottom of inner cylinder 1 and lower cylinder head 7. Note should be made of the fact that, by the above-described structure, inner cylinder 1 and plug 3 are insulated electrically from the outer cylinder 2 and from the two cylinder heads 6 and 7.

The liquid mixture whose dielectric value is to be measured is introduced into the space between cylinders 1 and 2.

The two cylinder head bosses 6a and 7a are made liquid-tight by sealing caps 16 and 17, which are sealed by resilient plastic gaskets 18 and 19. These two caps 16 and 17 are threaded onto the bosses 6a and 7a.

As explained previously, the capacitance of the cell can be changed by shifting the inner cylinder 1 axially within the outer cylinder 2. For fine adjustments in capacitance, a small condenser plate 20, rigidly attached to a supporting shaft 21 has been provided. See Figure 6. This support shaft 21 is threaded into a tubular housing 22 which is inserted into and is attached to the lower cylinder head 7 by any suitable means. Rotating supporting shaft 21 moves it and condenser plate 20 toward or away from the bottom of the inner cylinder 1. Condenser plate 20 is in electrical conductive contact with lower cylinder head 7 and is, therefore, part of the electrical circuit of outer cylinder 2. As the distance between the condenser plate 20 and inner cylinder 1 is decreased, the capacitance of the cell is increased. Support shaft 21 is sealed liquid-tight by a resilient plastic O-ring 23. A small gear 24 is attached to the outer end of support shaft 21 and is driven by another gear 25 which is attached to a shaft 26. Shaft 26 forms part of a power transmission system which leads upward through a universal joint 27 and another shaft 28, and terminates in a handwheel 29 which is located above the top of the temperature-controlled bath. See Figure 2. Rotating handwheel 29 will rotate support shaft 21 and this will then move the condenser plate 20 either toward or away from inner cylinder 1, thereby increasing or decreasing the capacitance of the cell. Shaft 28 is supported by a bracket 30 which is attached to an upper edge of tank 47 which holds the constant temperature bath. Shaft 26 runs through two holes 132, one in each of the two cylinder heads 6 and 7. These holes serve as bearings, and shaft 26 is aligned axially by two collars 31 and 32.

Electrical contact is made to the inner cylinder of the cell by a recessed rod 33 which is threaded into the bottom of the inner cylinder 1. See Figure 7. This rod 33 extends downwardly along the axis of a hollow threaded housing 34. The space between the rod 33 and the housing 34 is sealed liquid-tight by a resilient packing ring 35. This packing ring 35 is made of a material which also acts as an electrical insulator. Housing 34 is threaded into the lower cylinder head 7, and it is, therefore, in electrical conductive contact with cylinder head 7 of cylinder 2. The joint between the housing 34 and the lower cylinder head 7 is sealed liquid-tight by a resilient plastic gasket 36. As shown in Figure 7, the electrical terminal contacts of the cell provided by the rod 33 and the housing 34 are of such form that a standard microphone connector 98 can be used to complete the wiring between the cell and the associated capacitance meter which is used to make the electrical measurements (Figure 11).

Figure 8:
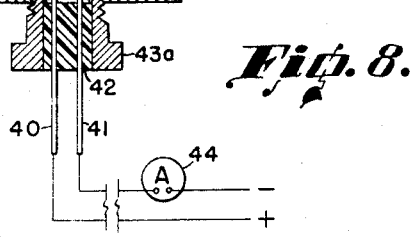
Figure 8 is a fragmentary vertical sectional view taken on line 8—8 of Figure 4 and shows one of the means for measuring the temperature of the contents within the cell.

The temperature of the liquid mixture within the cell is measured by a bead-type thermistor 37 (Figure 8) which is a very small temperature-sensitive electrical resistor. One thermistor is placed in each of cylinder heads 6 and 7. Each thermistor has two small wire leads 38 and 39 which extend from its opposite sides. These two small wire leads 38 and 39 are soldered to and supported by two relatively large pieces of wire 40 and 41. Wires 40 and 41 are forced through two holes drilled in a piece of resilient electrically insulating plastic 42. The two holes into which these wires are inserted are slightly smaller than the outside diameter of the wires, so that when the latter are inserted a liquid-tight seal is formed. The piece of resilient plastic 42 is pressed into bushing 43a in such a manner that a liquid-tight seal is formed. One of these bushings, 43a, is threaded into lower cylinder head 7 while another bushing 43 is threaded into upper cylinder head 6. The threads used form a liquid-tight seal. As a voltage is impressed on a thermistor 37, the current which flows can be measured by ammeter 44, and this current will vary with the temperature of the thermistor (Figure 8).

Figure 2:
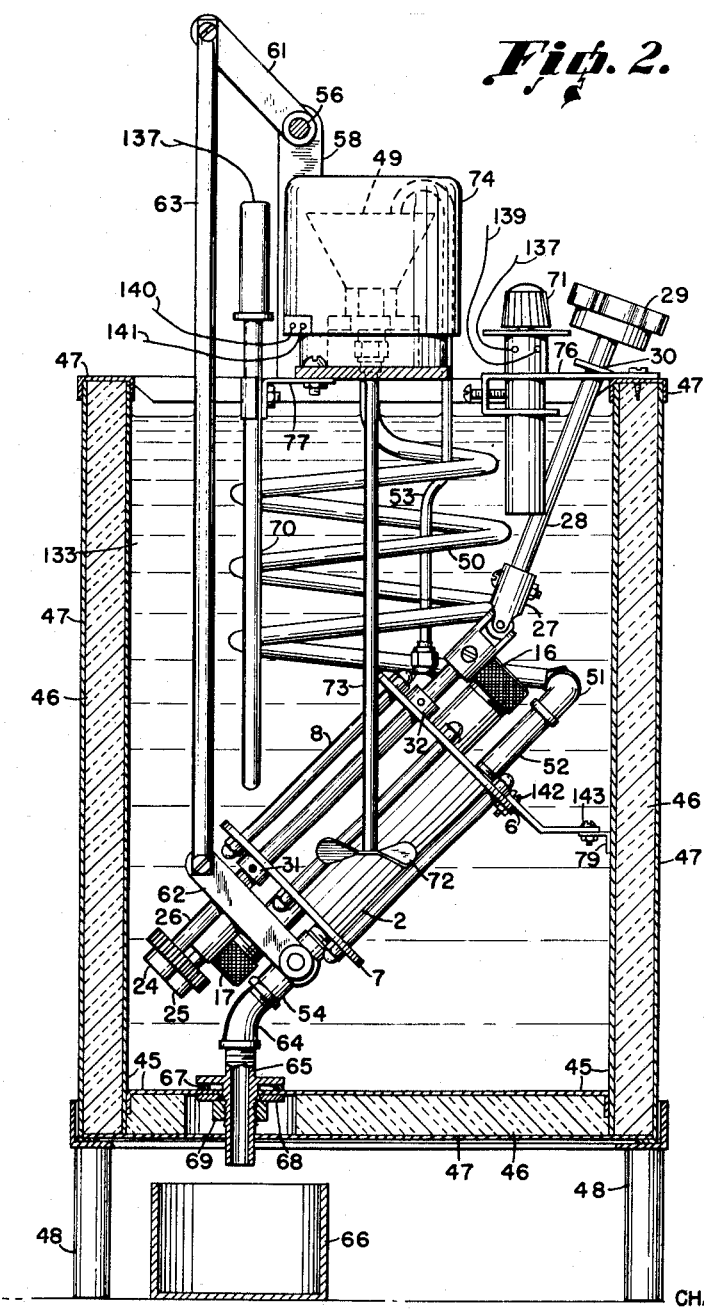
Figure 2 is a vertical sectional view taken on line 2—2 of Figure 1.

The cell proper is immersed in a constant temperature bath contained in tank 133, as shown in Figure 2. This tank consists of an inner liquid-tight metal lining 45 surrounded by thermal insulation 46, and is sheathed by an outer metal covering 47. The insulated tank, which is filled with a suitable heat-transfer liquid, such as mineral oil, is supported by rack 48.

The liquid mixture to be tested is placed in the cell by pouring it into screened funnel 49 which is supported by bracket 75 attached to covering 47. From this funnel 49, the liquid flows directly into the cell through coiled heat exchange tube 50, pipe fitting 51, and a short length of pipe 52 screwed into hole 134 in cylinder head 6. Coiled tube 50 is completely immersed in the heat-transfer liquid which serves either to heat or cool the mixture as it travels through the tube. Provision is made for venting the cell so that any air trapped in the fluid being tested can be eliminated. This vent is through a piece of tubing 53 which is led vertically from an orifice 135 in cylinder head 6 above the level of the heat-transfer liquid and then curved into the funnel 49 in such a manner that any liquid which overflows through the vent tube 53 is returned to the cell. The cell is installed in the bath at an angle of approximately 45 degrees, so that the orifice through which air escapes by means of tubing 53 is at the uppermost point of the cell. A small amount of air may be trapped in the upper corner; but because inner cylinder 1 does not extend into this corner, the entrapped air is not in the active electrical field of the cell.

Provision is made for draining the cell by means of stopcock 54, which is screwed into lower cylinder head 7 and is positioned to drain from the lowest point of the cell. Stopcock 54 can be opened and closed by handle 55 which is located above the constant temperature bath. This handle is attached to shaft 56 which is supported by two brackets 57 and 58, attached to the outside sheath 47 of the tank. Axial movement of the shaft is prevented by two collars 59 and 60 secured to the shaft and which bear against two support brackets 57 and 58. Also attached to shaft 56 is crank lever 61. A similar crank lever 62 is attached to cell drain cock 54. Push rod 63 connects these two crank levers. The system is such that when handle 55 is turned, shaft 56 to which it is attached rotates and turns crank lever 61 which pulls or pushes rod 63 to turn crank lever 62, and consequently either opens or closes cell drain cock 54. Liquid from the cell flows through the drain cock 54, pipe fitting 64, short length of flanged tubing 65, and into a suitable receptacle 66, which is below the tank. A flexible seal is made between the flanged tubing 65 and the inner liquid-tight lining 45 of the tank. The sealing is accomplished by an oil-resisting rubber O-ring 67 which is clamped between flange 136 on flanged tubing 65 and the inner lining 45 of the tank by washer 68, and a nut 69 which is threaded onto the flanged tubing 65. It will be apparent that the function of draining the cell of liquid could also be accomplished by other means, such as, a solenoid valve actuated by a switch, instead of employing the manually operated system illustrated by parts 54, 55, 56, 57, 58, 59, 60, 61, 62, and 63.

Figure 9:
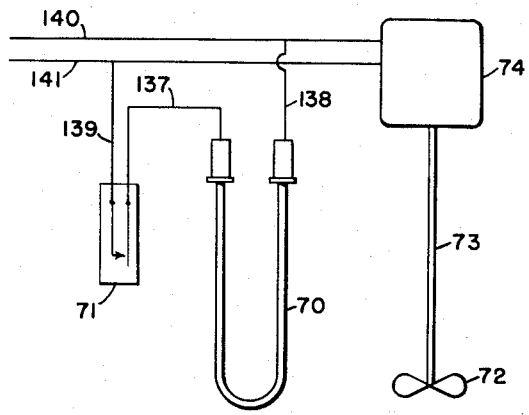
Figure 9 is a diagram of the wiring circuit for maintaining the bath around the cell at constant temperature.

Heat is supplied to the heat-transfer liquid of the bath by an electrical heater 70 which is supplied with current through leads 137 and 138. This electrical heater is controlled by thermostat 71 which breaks the circuit to the heater when a desirable temperature has been reached and closes the circuit when the temperature falls below a certain limit (Figure 9). Thermostat 71 is in series with the heating element 70 and supply lines 140 and 141, being connected to leg 141 by means of conductor 139 and to the heater by means of conductor 137. In order to assure uniform temperature throughout the heat-transfer liquid in the tank, a stirring propeller 72 is provided to agitate this liquid. This propeller and its driving shaft 73 are powered by an electric motor 74 connected to power line 140—141. The motor is attached to and supported by bracket 75 which also supports funnel 49. Thermostat 71 is supported by bracket 76 attached to the upper edge of the outer covering 47 of the tank. Heater 70 is supported by bracket 77 which is attached to motor-support bracket 75.

The cell proper is supported at two points within the tank. At the upper end, the cell is supported by a plate 78 which is attached to the upper cylinder head 6 of the cell by means of bolt 142 and to bracket 79 by means of bolt 143 which is secured to the inner lining 45 of the tank. The lower end of the cell is supported by the cell drain pipe assembly 54, 64, 65, 68, and 69.

The cell is connected to the capacitance measuring circuit by means of a conventional microphone connector 98 and shielded cable 97 (Figure 7 and 11).

Figure 10:
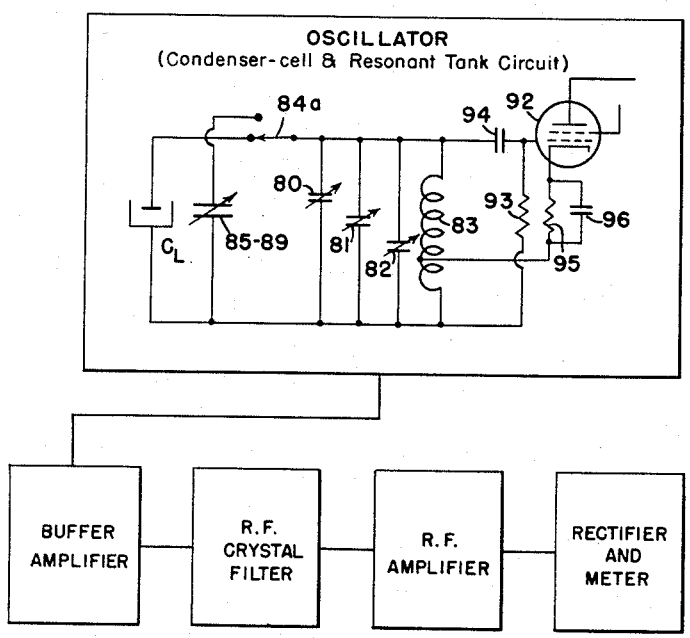
Figure 10 is a block diagram of the capacitance meter employed with the apparatus and shows a simplified circuit of the radio frequency oscillator.

The capacitance meter is essentially a radio frequency oscillating circuit in which the capacitance to be measured is substituted for one of known value and the circuit brought back to resonance by means of a calibrated variable condenser. This circuit is shown in simplified form in Figure 10 and in detail in Figure 11. In Figure 10, a single variable condenser 85—89 is shown in place of the individual condensers 85, 86, 87, 88, and 89 in Figure 11, and the four-position rotary switch 84 in Figure 11 is shown as a simplified two-position switch 84a in Figure 10.

As shown in Figures 10 and 11, the measuring circuit comprises a radio frequency (R.F.) oscillator, a cathode follower amplifier, a crystal filter frequency discriminator, an R.F. amplifier, and a rectifier. The R.F. oscillator uses a 6V6GT tetrode tube 92, and has in the resonant L–C, or tank circuit, a calibrated variable condenser 80, zeroing condensers 81 and 82 and tapped inductor 83.

Switch 54, which is a two-pole, four-position rotary switch, permits condensers 85, 86, 87, 88, 89, of preset value, and the test cell itself to become part of the resonant tank circuit as desired. Inductance 83, the oscillator tank coil, is a permeability-tuned coil with a center inductance of 95 microhenrys. The tap to the cathode of tube 92 is made about 5 microhenrys from the ground end of inductance 83. Resistor 93 and condenser 94 provide grid bias in the usual manner; but cathode bias, provided by resistor 95 and condenser 96, is also used as a precautionary measure.

The capacitance component of the resonant tank circuit consists of the condenser-cell $C_L$, condensers 80, 81, 82, 85, 86, 87, 88, and 89, and the residual circuit capacitances. Condensers 85, 86, 87, 88, and 89, are used as standards. For these standards, aged zero temperature coefficient ceramic condensers and suitable air padder condensers are used. The total capacitance of condensers 87 and 88 approximately equal the total capacitance of the connecting cable 97, connector 98, and the condenser-cell $C_L$, with air as the dielectric medium in the cell. The total capacitance of condensers 85, 86, 87, and 88, is approximately equal to the capacitance of the condenser-cell ($C_L$) times the maximum dielectric constant of the liquid to be measured, plus the capacitance of connecting cable 97, and connector 98. In order to get a zero adjustment at midscale on the indicating dial of the condenser 80, one-half of its maximum capacitance, or range, is added to capacitance circuit of condensers 85, 86, 87, and 88. The capacitance of condenser 89, is slightly less than that of condenser 80 and, when calibrated, will provide another scale on which lower dielectric constants of test liquids can be read. Condenser 80 is of high quality to assure repeatable results and linear calibration. The capacity differential required in condenser 80 is dependent on the necessary accuracy for the range of dielectric measurement to be made. With a capacity of 50 micromicrofarads and a suitable dial, an accuracy of ±0.05 micromicrofarad in measured capacitance is attainable. In this particular application of measuring the oil content of cottonseed, where a maximum dielectric constant of 8.6 is encountered, the condenser 80 has a differential capacity of 44 micromicrofarads and it is fitted with a calibrated dial that allows a reading accuracy of ±0.1 micromicrofarad. The zeroing condensers, condensers 81 and 82, are air padder type condensers. Condenser 81, having a capacity differential of about 45 micromicrofarads is used in an initial adjustment of the capacitance meter, and it is not absolutely essential. Condenser 82 has a capacity differential of about 5 micromicrofarads and it is used to compensate for variations occurring in other circuit components caused by temperature changes and aging.

The plate load of the 6V6GT oscillator tube 92 is composed of the inductance 99 having a value of 2.5 millihenries, and voltage divider resistors 100 and 101. This voltage divider is necessary in the circuit because the output of the oscillator is greater than needed for the frequency discriminator network or crystal filter circuit described below.

A coupling condenser 102 feeds the signal from the voltage divider (100 and 101) to the grid of a 6SN7 cathode follower buffer amplifier tube 103. The output circuit of the 6SN7 is connected to the primary of a standard 455 kilocycle transformer 104. The secondary of transformer 104, is connected to a bridge circuit made up of resistors 105 and 106, a 455 kc. crystal 91 and condenser 107. Condenser 107, a zero temperature coefficient ceramic trimmer, is used to balance out the capacitance of the crystal and its holder. This bridge circuit eliminates the secondary resonance point of the crystal and increases the Q factor of the crystal.

The 455 kilocycle signal from the filter is coupled to a conventional radio frequency amplifier by means of condenser 108 to a 6AC7 tube 109. The plate load of tube 109 is transformer 110. The latter is a special transformer consisting of a 2.5 millihenry choke primary with 30 turns of No. 30 D.C.C. wire wound over it to form the secondary. The low impedance secondary of transformer 110 gives a fairly efficient match between the output of R.F. amplifier (109) and the rectifier-meter circuit. The variable resistor, or potentiometer 111, connected across the secondary of transformer 110, provides means of attenuating the output of the R.F. amplifier to a convenient level for indicating a signal on the 1 milliampere meter 90, of the rectifier-meter unit.

In the rectifier-meter network which is connected to potentiometer 111, a 1N34 germanium diode 112, rectifies the radio frequency signal and a condenser 113 is used as a radio frequency bypass to ground across milliammeter 90, to eliminate any stray radio frequency signal from passing through that direct current instrument. It will be apparent that a vacuum diode tube, and any null indicating device such as a cathode-ray tuning eye, could be substituted respectively for the germanium diode 112 and milliammeter 90.

The condensers 114, 115, 116, 117, 118, 119, 120, and the resistors 121, 122, 123, 124, 125, 126, 127, 128, 129, which are part of the circuit network illustrated in Figure 11 are elements commonly used in combination as coupling and regulating constants in electronic circuits and as such their application and function in this circuit network will be understood by anyone skilled in the art. The values of the various condensers and resistors are listed in the table below, although it will be apparent to one skilled in the art that changes and substitutions may be made in these components without departing from the basic operation of the apparatus or the concept of the invention:

Table I

| Component: | Values |
|---|---|
| Condenser 80 | 0–44.2 mmf. |
| Condenser 81 | 5–50 mmf. |
| Condenser 82 | 2–7 mmf. |
| Condenser 85 | 800–850 mmf. |
| Condenser 86 | 100 mmf. |
| Condenser 87 | 100 mmf. |
| Condenser 88 | 250–300 mmf. |
| Condenser 89 | 75 mmf. |
| Condenser 94 | 100 mmf. |
| Condenser 96 | 0.02 mfd., 200 v. |
| Condenser 102 | 500 mmf. |
| Condenser 107 | 11 mmf. |
| Condenser 108 | 33 mmf. |
| Condenser 113 | 0.001 mfd., 200 v. |
| Condenser 114 | 0.1 mfd., 600 v. |
| Condenser 115 | 0.1 mfd., 600 v. |
| Condenser 116 | 0.1 mfd., 600 v. |
| Condenser 117 | 500 mmf. |
| Condenser 118 | 0.02 mfd., 600 v. |
| Condenser 119 | 0.04 mfd., 600 v. |
| Condenser 120 | 0.1 mfd., 600 v. |
| Resistance 93 | 42,000 ohm, ½ watt. |
| Resistance 95 | 270 ohm, 2 watt. |
| Resistance 100 | 1 megohm, ½ watt. |
| Resistance 101 | 0.1 megohm, ½ watt. |
| Resistance 105 | 47,000 ohm, ½ watt. |
| Resistance 106 | 47,000 ohm, ½ watt. |
| Resistance 111 | 10,000 ohm, wirewound. |
| Resistance 121 | 40,000 ohm, 5 watt. |
| Resistance 122 | 100 ohm, 1 watt. |
| Resistance 123 | 0.1 megohm, ½ watt. |
| Resistance 124 | 39,000 ohm, ½ watt. |
| Resistance 125 | 25,000 ohm, 1 watt. |
| Resistance 126 | 0.1 megohm, ½ watt. |
| Resistance 127 | 330 ohm, ½ watt. |
| Resistance 128 | 0.1 megohm, ½ watt. |
| Resistance 129 | 47,000 ohm, ½ watt. |

The apparatus requires a power supply capable of delivering 150 volts D.C. (regulated) at 40 milliamperes output and also 6.3 volts A.C. at 1.5 ampere output.

As stated above, the utility of the apparatus for determining the oil content of fluid mixtures is based on the measurement of the difference in the dielectric properties of various mixtures of oil and a solvent, such as, orthodichlorobenzene, the amount of this difference depending upon the weight proportions of oil orthodichlorobenzene in the mixture. By using constant weights of cottonseed and orthodichlorobenzene for each extraction, the weight proportions of each constituent in the extract is then dependent on the oil content in the seed. If a series of cottonseed samples of known oil content are extracted with orthodichlorobenzene of known dielectric coefficient, and the dielectric property of each corresponding mixture of oil and orthodichlorobenzene is measured, a calibration curve can be prepared. The oil content of any other cottonseed sample may then be determined by extracting the oil with the orthodichlorobenzene, measuring the dielectric property of the specific oil-orthodichlorobenzene mixture, and referring the observed capacitance value to the calibration curve.

A preferred procedure for preparing an extract of cottonseed for measuring its oil content with the above described apparatus is as follows: The first step involves the extraction of oil from 50 grams of cottonseed in a high speed grinder using 250 grams of orthodichlorobenzene as the extractant. This particular weight ratio of seed to solvent was found to be efficient and economical for cottonseed. However, for other oil seeds a different weight ratio of oil to solvent may be equally suitable. Before the extraction is started, 30 to 40 grams of anhydrous calcium chloride (hydrophilite) are added. The anhydrous calcium chloride has a desiccating action which prevents moisture in the seed from becoming absorbed by the oil-orthodichlorobenzene mixture. Although the literature states that water is practically insoluble in both oil and orthodichlorobenzene, sufficient absorption takes place when water is present in the test specimen to materially affect the dielectric properties of the extract. Thus by using anhydrous calcium chloride as an additive before the extraction, the oil content of any sample of seed may be determined regardless of its natural moisture content. Other drying agents may be used, care being taken, however, to avoid the use of materials, such as, aluminum oxide, which will adsorb some of the oil and thus make any determination erroneous.

In the second step of the procedure the oil-orthodichlorobenzene solution is separated from the macerated seed. Lint and larger hull particles are removed by pouring the ground mass of seed through a 40 mesh screen which is soldered to the lower inside walls of a metal cylinder. The bottom of the cylinder is attached to a funnel which is inserted into the inlet of an air filter press which utilizes a commercial filter paper as the filtering medium and which serves to remove the fine meat and hull particles. Ground mass remaining on the screen is first pressed with a wooden plunger to remove as much of the adhering liquid portion as possible. About 5 to 10 pounds of air pressure per square inch is adequate for efficient filtration of a fluid mixture for determining the oil content with the apparatus.

Operation of the apparatus for determining oil content of a fluid mixture is as follows: After the fluid mixture has drained from the filter press, it is introduced into funnel 49 and flows by gravity through tube 50 and into the condenser-cell to completely fill the space between cylinders 1 and 2. The purpose of the coiled tube 50 above the condenser-cell is to provide a means for bringing the temperature of the fluid mixture very close to that of the cell, thus reducing the time for temperature stabilization of the fluid mixture inside the cell. Both the coiled tube and the condenser-cell are submerged in the temperature-controlled bath which is held at a constant temperature of 50° C.±0.05°.

After the temperature of the oil-orthodichlorobenzene mixture has become constant inside the cell a reading is taken of the capacitance of the filled cell. This reading can be indicated directly in oil content or it can be used in conjunction with a prepared calibration chart or curve to obtain the oil percentage in the seed for each meter reading. The cell is connected to the capacitance meter with the microphone connector 98 and shielded cable 97 (Figures 10 and 11).

After the reading on the meter has been taken the test mixture is drained from the cell by opening drain cock 54 located at the lower end of the cell. No flushing of the cell between the testing of fluid samples is required because complete draining is effected. The capacitance meter and associated dielectric circuit are especially designed for detecting extremely small changes of capacitance. The capacitance meter is also arranged for checking, in the cell, the dielectric value of pure orthodichlorobenzene. This is necessary in order that the cell capacitance may be adjusted to compensate for varying dielectric properties of different batches of orthodichlorobenzene.

The capacitance meter is utilized as follows:

Switch 84, connects various selected combinations of standard condensers 85, 86, 87, 88, and 89, condenser-cell $C_L$, and cable capacitance (97+98) to banked condensers 80, 81, and 82 to form the capacitance system of the tank circuit of the oscillator (Figure 11). In position 1 (zero position), switch (84) connects condensers 85, 86, 87, and 88, to the condenser bank (80+81+82) of the tank circuit; and with the calibrated condenser 80 set at a predetermined setting (mid-scale), condenser 82 is adjusted to give maximum signal indication on milliammeter 90. In position 2, the switch (84) connects condenser-cell $C_L$, containing the test liquid, cable capacitance (97+98), and condenser 89, to the condenser bank (80+81+82) of the tank circuit; and the calibrated condenser 80 is then used to retune the capacitance meter to resonance, as shown by a maximum signal indication on the milliammeter, to obtain a measurement of the capacitance of cell $C_L$. The capacitance measurable (condenser-cell with liquid in switch position 2 is: condensers (85+86) plus condensers (87+88) minus condenser 89 minus the cable capacitance (97+98) plus or minus ½ of the capacitance of condenser 80. In position 3, the switch (84) connects the condenser-cell $C_L$, and cable capacitance (97+98) to the condenser bank (80+81+82) of the tank circuit; and the capacitance measurable is the value of condenser 89 by subtraction from the circuit value of the switch position 2. In its position 4, the switch (84) connects the condenser-cell $C_L$, cable capacitance (97+98), and condensers 85, 86, to the condenser bank (80+81+82) of the tank circuit. This connection primarily is used for checking the condenser-cell and its connecting cable, and therefore measures capacitance values approximating those of the condenser-cell plus the connecting cable. It will be apparent additional scales, based on different evaluation, can be added to the capacitance meter by employing the circuits used with position 2 of switch 84.

By using the above-described apparatus, it is possible to carry out a determination of the oil content of a sample of cottonseed with great accuracy in a few minutes. The present official chemical method of analysis requires elaborate equipment and a minimum of 12 hours for completion.

It will be obvious to one skilled in the art that various modifications as to size of parts or values of circuit components may be made without departing from the spirit of the invention.

We claim:

1. Apparatus for determining the relative proportions of two liquids of known dielectric constant comprising a tank for holding a constant temperature bath; a capacitance cell for holding a liquid to be tested rigidly mounted within the tank in an axially inclined position with respect to said tank, said cell comprising an outer cylindrical member of electrically conductive material constituting one plate of a condenser and having an inlet end and an outlet end, an inner cylindrical cup-like member of electrically conductive material constituting the second plate of a condenser disposed coaxially within said outer cylindrical member, said outer cylindrical member being provided with liquid inlet means and air vent means at the inlet end and liquid outlet means at the outlet end, a first rod axially disposed to said outer cylindrical member extending into the outer cylindrical member through the outlet end thereof, an electrically non-conductive sheath surrounding said first rod, a conical shaped end piece of electrically non-conductive material secured to the end of said first rod within the outer cylindrical member and bearing against the bottom of the inner cylindrical cup-like member, adjustment means connected to said first rod adapted to propel and retract said first rod axially within said outer cylindrical member, a cylindrical plug of electrically non-conductive material inserted into the open end of the inner cup-like cylindrical member to seal said inner cup-like cylindrical member, a second rod axially disposed to said outer cylindrical member provided with a conical end member and extending axially into the outer cylindrical member through the inlet end thereof and bearing against the plug in the open end of the inner cup-like cylindrical member, adjustment means connected to said second rod adapted to propel and retract said second rod axially within the outer cylindrical member, said first and second rod constituting means for supporting and positioning the inner cup-like cylindrical member coaxially within the outer cylindrical member to define a first elongated annular space of substantially uniform cross section between the inner curvilinear wall of the outer cylindrical member and the outer curvilinear wall of the inner cup-like cylindrical member and also defining second and third annular spaces between the inlet and outlet ends of the outer cylindrical member and the corresponding adjacent ends of the inner cup-like cylindrical member, said second and third annular spaces being coextensive with the adjacent cylinder ends, said three annular spaces all being in communication with each other and with the air vent means and with the liquid inlet and outlet means, electrically conductive means connected to a conductive surface of the inner cylindrical cup-like member and extending through the outer cylindrical member to the exterior thereof, an electrically conductive rod extending through the end of the outer cylindrical member adjacent the conductive bottom of the inner cylindrical cuplike member into the annular space defined by the said ends of said cylindrical members, adjustment means connected to said electrically conductive rod for propelling and retracting said electrically conductive rod within said annular space thereby to effect a change in the electrical capacitance of the cell, and means connected to the liquid outlet means extending from the liquid outlet means to a point outside the tank for opening and closing said liquid outlet means; and an electronic capacitance meter comprising an interconnected oscillator circuit, R.F. amplifier circuit, rectifier circuit, and meter circuit, said oscillator circuit having a plurality of condensers of preselected capacitance and a calibrated variable condenser in the tank circuit thereof, and means for alternately connecting said calibrated variable condenser and said capacitance cell in parallel with said pluralities of condensers of preselected capacitance.

2. A capacitance cell for determining the relative proportions of two liquids of known dielectric constant comprising an outer cylindrical member of electrically conductive material constituting one plate of a condenser and having an inlet end and an outlet end, an inner cylindrical cup-like member of electrically conductive material constituting the second plate of a condenser disposed coaxially within said outer cylindrical member, said outer cylindrical member being provided with liquid inlet means and air vent means at the inlet end and liquid outlet means at the outlet end, a first rod axially disposed to said outer cylindrical member extending into the outer cylindrical member through the outlet end thereof, an electrically non-conductive sheath surrounding said first rod, a conical shaped end piece of electrically non-conductive material secured to the end of said first rod within the outer cylindrical member and bearing against the bottom of the inner cylindrical cup-like member, adjustment means connected to said first rod adapted to propel and and retract said first rod axially within said outer cylindrical member, a cylindrical plug of electrically non-conductive material inserted into the open end of the inner cup-like cylindrical member to seal said inner cup-like cylindrical member, a second rod provided with a conical end member extending axially into the outer cylindrical member through the inlet end thereof and bearing against the plug in the open end of the inner cup-like cylindrical member, adjustment means connected to said second rod adapted to propel and retract said second rod axially within the outer cylindrical member, said first and second rod constituting means for supporting and positioning the inner cup-like cylindrical member coaxially within the outer cylindrical member to define a first elongated annular space of substantially uniform cross section between the inner curvilinear wall of the outer cylindrical member and the outer curvilinear wall of the inner cup-like cylindrical member and also defining second and third annular spaces between the inlet and outlet ends of the outer cylindrical member and the corresponding adjacent ends of the inner cup-like cylindrical member, said second and third annular spaces being coextensive with the adjacent cylinder ends, said three annular spaces all being in communication with each other and with the air vent means and with the liquid inlet and outlet means, electrically conductive means connected to a conductive surface of the inner cylindrical cup-like member and extending through the outer cylindrical member to the exterior thereof, an electrically conductive rod extending through the end of the outer cylindrical member adjacent the conductive bottom of the inner cylindrical cup-like member into the annular space defined by the said ends of said cylindrical members, adjustment means connected to the electrically conductive rod for propelling and retracting said electrically conductive rod within said annular space thereby to effect a change in the electrical capacitance of the cell, and means connected to the liquid outlet means for opening and closing said liquid outlet means.

References Cited in the file of this patent

UNITED STATES PATENTS

| | | |
|---|---|---|
| 2,485,579 | Elliott | Oct. 25, 1949 |
| 2,567,921 | Boehn | Sept. 18, 1951 |
| 2,605,271 | Hunn et al. | July 29, 1952 |
| 2,616,909 | Carter | Nov. 4, 1952 |
| 2,654,067 | Bruce | Sept. 29, 1953 |
| 2,720,624 | Gunst et al. | Oct. 11, 1955 |
| 2,724,798 | Hare et al. | Nov. 22, 1955 |